United States Patent [19]

Prince

[11] 4,261,383
[45] Apr. 14, 1981

[54] FIELD CONVERTIBLE SUMP CHECK VALVE

[75] Inventor: Darryll G. Prince, Norman, Okla.

[73] Assignee: K-F Prince Valve, Inc., Norman, Okla.

[21] Appl. No.: 44,237

[22] Filed: May 31, 1979

[51] Int. Cl.³ .............................................. F16K 15/18
[52] U.S. Cl. ................................. 137/270; 137/527.4; 137/515.5; 251/83; 251/298
[58] Field of Search .................. 137/527, 527.2, 527.4, 137/515.5, 515.7, 269.5, 270; 251/83, 306, 303, 298

[56] References Cited

U.S. PATENT DOCUMENTS

| | | | |
|---|---|---|---|
| 2,001,941 | 5/1935 | Rowe | 137/527 X |
| 3,191,619 | 6/1965 | Allen | 137/527 X |
| 3,395,727 | 8/1968 | Weise | 137/527 X |
| 3,544,066 | 12/1970 | Fawkes | 251/306 |
| 3,612,097 | 10/1971 | Prince | 137/527.4 |
| 3,883,111 | 5/1975 | Jourdan | 137/527 X |
| 3,959,827 | 6/1976 | Kaster | 137/527.4 X |

*Primary Examiner*—Alan Cohan

*Attorney, Agent, or Firm*—Hubbard, Thurman, Turner, Tucker & Glaser

[57] ABSTRACT

A swing check valve having a generally cylindrical body with a fluid passageway extending therethrough, an annular resilient seat molded in place within the passageway and oriented normal to the passageway axis and a clapper assembly pivotally mounted for rotation about an axis normal to the passageway axis. The clapper assembly includes an arm removably connected to a shaft extending through the body and a generally circular valve loosely mounted to the arm and adapted to engage the seal. The shaft is disposed for rotation within a bore extending completely through the body and a lever is removably attached to the external end of the shaft to permit manual operation of the valve. In order to prevent the valve from slamming shut in the event of a sudden flow reversal, it is spring biased toward a closed position with a spring attached to the lever. The check valve can be easily converted from right to left hand operation or vice versa by removing the lever from the shaft, loosening the clapper arm, reversing the position of the shaft in the body and reinstalling the lever.

12 Claims, 5 Drawing Figures

FIELD CONVERTIBLE SUMP CHECK VALVE

BACKGROUND OF THE INVENTION

This invention relates generally to a check valve, and more particularly to a manually operable swing check valve intended for use in a sanitary sewer system which can be easily converted in the field from right to left hand operation or vice versa. A wide variety of check valves are available to permit fluid to flow in one direction in a conduit to prevent it from flowing in the other. When used in sanitary sewer systems such valves must exhibit a high degree of reliability and a resistance to clogging and corrosion. They should be relatively compact and ideally should be usable in vertical as well as horizontal conduits. Also, they should be relatively inexpensive to manufacture and easy to repair.

If the check valve is to be used as a sump valve in a sanitary sewer lift station additional requirements may be imposed. In many conventional lift stations, a check valve is positioned immediately downstream of each sump pump to permit flow to pass in the downstream direction, but to prevent any reverse flow into the pump. In such systems it is necessary that the pump impellers be cleaned periodically and highly desirable that the cleaning can be done without removing the pumps from the lift station. The easiest way to accomplish this is to block the discharge side of each pump while it is running and allow the pressurized fluid on the discharge side to clean the impeller. The check valves normally employed cannot be used for this purpose because they are designed to block flow only in the direction of the pumps. A conventional shutoff valve can be added to the discharge line, but this solution will increase the cost of the system and will require the operator to stock two different valves for repair purposes. Accordingly, it would be desirable to provide for a check valve which could be selectively used to block flow in either direction.

For reliability and economy, any such check valve should be manually operable. The limited accessability of the pumps and check valves in many lift stations requires that both valves be operable from the same side, while the design of the discharge system requires that the valves be mounted in opposite directions. To satisfy these requirements, right and left hand models of the same valve ordinarily would have to be manufactured, and the two different models would have to be stocked for repair purposes.

In an effort to provide an improved swing check valve the inventor herein developed the valve described in U.S. Pat. No. 3,612,097, which was issued on Oct. 12, 1971. The valve disclosed in that patent represents a definite advance in the state of the art and has achieved significant commercial success. The valve is not designed for manual operation, however. Also, experience with the valve has indicated that certain modifications and improvements are desirable. Under some flow conditions the valve tended to spin when open, resulting in an undesirable amount of wear on the rivet used to join the valve and arm. Also the receding valve seat protruded radially inward of the inner wall of the flow passageway to facilitate removal, but tended to cause debris to collect upstream of the seat and interfere with seating. In an effort to provide for a manually operable swing check valve which could be easily converted for use in either position in a lift station and to further improve the patented valve the present invention was made.

SUMMARY OF THE INVENTION

This invention can be broadly summarized as providing for an improved manually operable swing check valve which is easily convertible from right hand to left hand operation or vice versa. The valve is described as having a generally cylindrical body defining a fluid passageway extending through the body, an annular resilient seat disposed within the passageway, an arm pivotally mounted for rotation within the passageway about an axis substantially normal to the longitudinal axis of the body, a generally circular valve loosely connected to the arm and adapted to sealably engage the seat, biasing means for urging the valve into a closed position, and an externally mounted, removable lever connected to the arm and permitting manual operation of the check valve.

In accordance with a more detailed aspect of the invention, a check valve is further described as including a shaft removably connected to the arm and the lever and disposed for rotation in a bore extending completely through the body.

In accordance with another detailed aspect of the invention, the valve is biased toward a closed position by an externally mounted coiled spring extending between the lever and a bracket extending from the body.

DESCRIPTION OF THE PREFERRED EMBODIMENT

Figure 1:
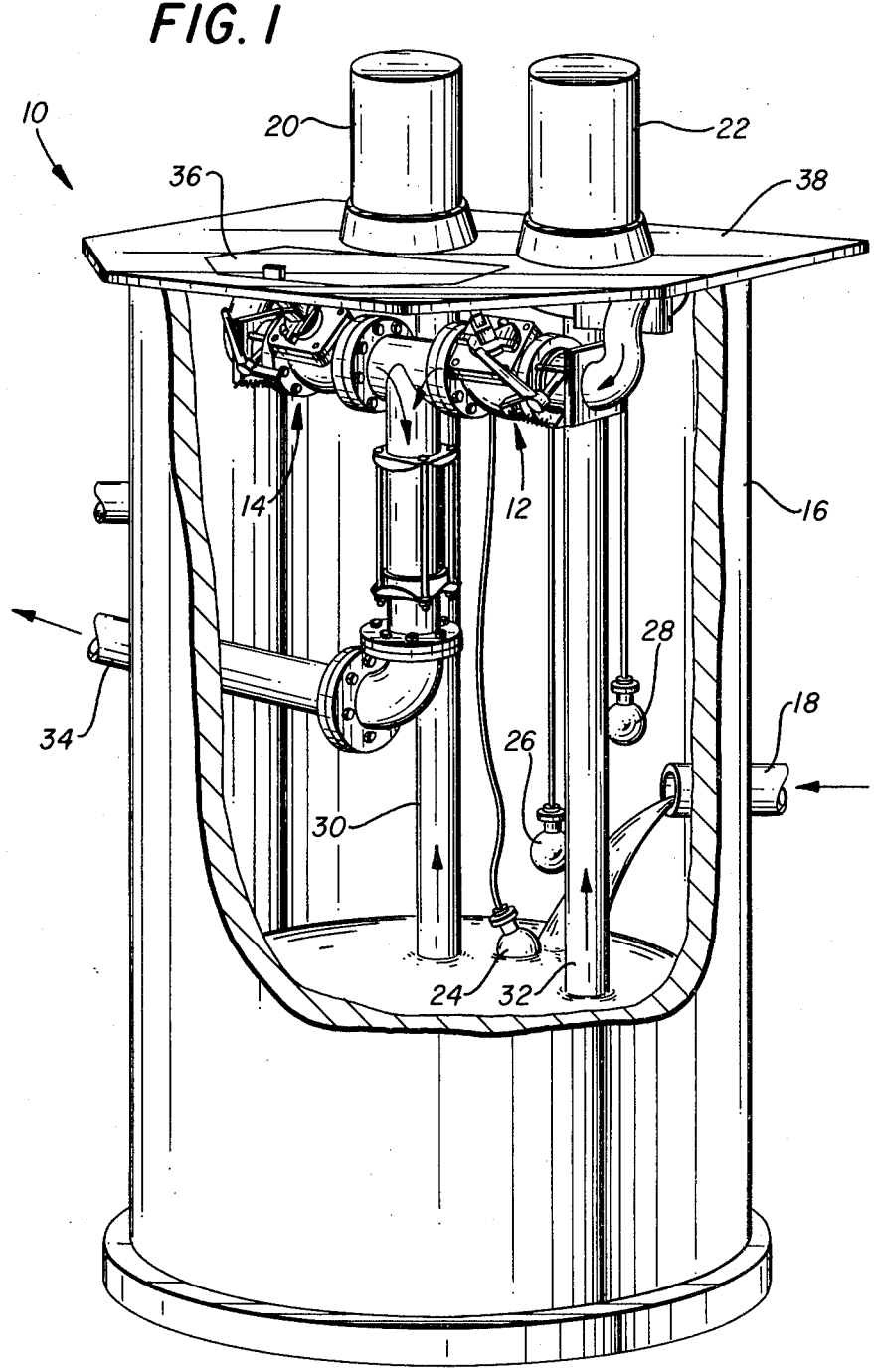
FIG. 1 is a perspective view of a typical sanitary sewer lift station, partially broken away, in which two swing check valves constructed in accordance with this invention are installed.

The novel features believed characteristic of this invention are set forth in the appended claims. The invention itself may be best understood and its various objects and advantages best appreciated, however, by reference to the detailed description below in connection wth the accompanying drawings. In FIG. 1 of those drawings a typical sanitary sewer lift station generally designated by the numeral 10 is illustrated in which two check valves constructed according to the present invention have been installed. The check valve generally designated by the numeral 12 is arranged for left hand operation and is shown in greater detail in FIGS. 2-5. The other check valve, generally designated by the numeral 14, is identical in all respects to check valve 12 except that it has been arranged for right hand operation. Lift station 10 includes a sump casing 16 which is filed through sewage inlet 18. Electrically driven centrifugal pumps 20 and 22 which are controlled by floats 24, 26, and 28, lift sewage from the bottom of the sump through pickups 30 and 32, respectively, and discharge it at a higher elevation through the check valves 12 and 14 and finally through outlet 34. Depending on the level of the sewage, either one or both of the pumps may be operated. Access to each of the pumps is provided by access door 36 which is located in top plate 38.

Figure 3:
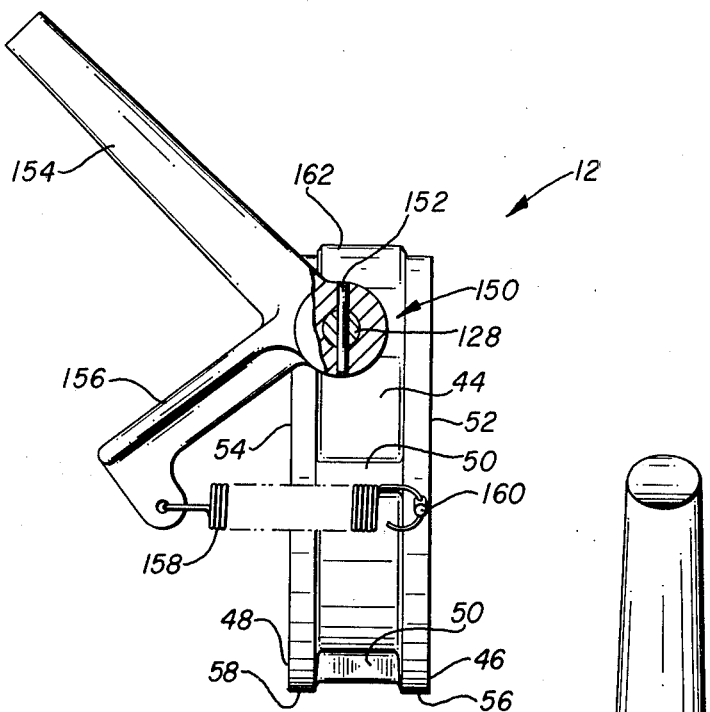
FIG. 3 is a side view of the check valve of FIG. 2.
Figure 2:
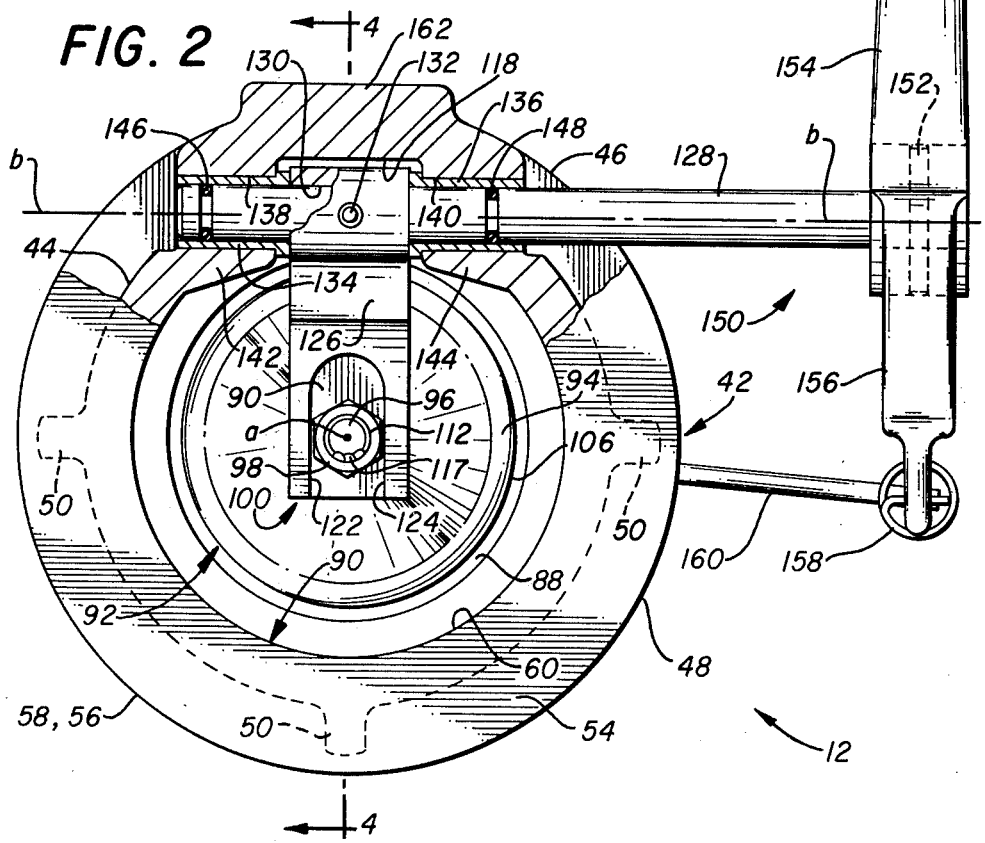
FIG. 2 is a rear view of the disclosed check valve partially broken away in section looking in an upstream direction along the axis of the valve.

Referring now to FIGS. 2 and 3, check valve 12 has a cast and machined body 42 which includes a generally cylindrical sleeve portion 44. The valve is bounded on its upstream and downstream ends by radially extending flanges 46 and 48, respectively, which are reinforced by three circumferentially spaced webs 50. Flange faces 52 and 54, which lie in parallel planes, are substantially flat and contain a plurality of small machined concentric grooves (not shown) to facilitate gasket sealing. The axial length of the check valve is the distance measured between these parallel planes along longitudinal axis "a". The outer circumference of each of the flanges, defined by surfaces 56 and 58, is sized to fit closely within the bolt circle of a standardized bolted pipe flange.

Figure 4:
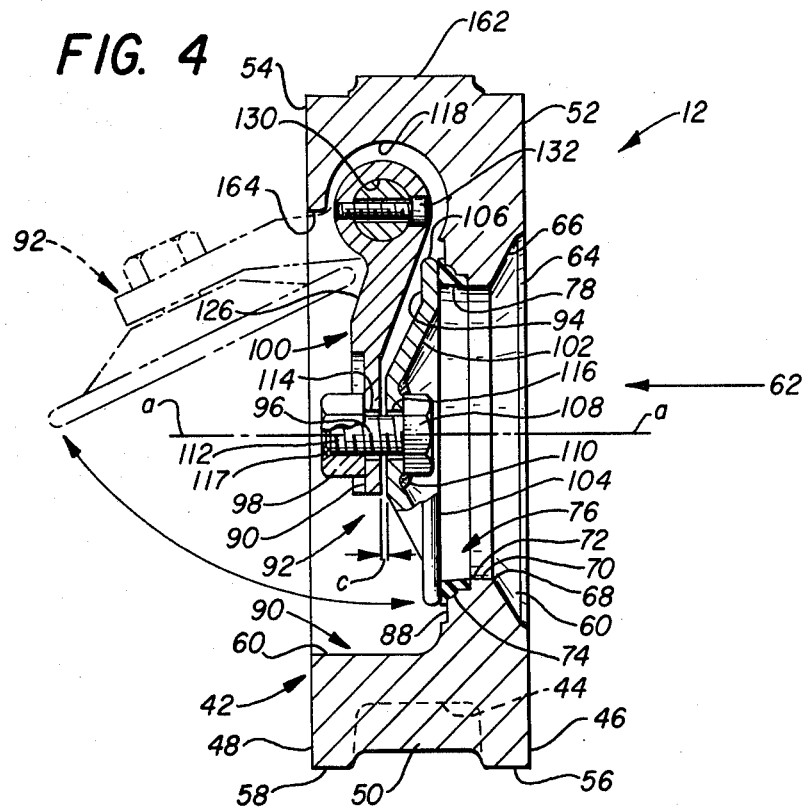
FIG. 4 is a sectional view of the valve of FIG. 2 taken along lines 4—4.
Figure 5:
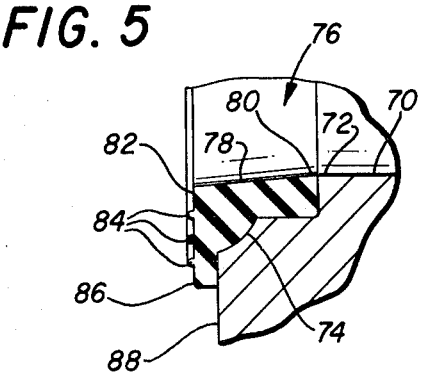
FIG. 5 is an enlarged view of a portion of the valve of FIG. 4 showing details of the seal and seal recess.

As shown in FIG. 4, check valve 12 also has an inner surface 60 which defines a fluid pathway extending axially through the valve and generally indicated by numeral 62. The passageway begins on the upstream side of the valve at opening 64 which has a diameter corresponding to the nominal inside diameter of the upstream section of the fluid conduit (not shown). Proceeding in a downstream direction the passageway tapers radially inward through section 66 to a point of minimum diameter at location 68. From that point the diameter increases gradually through section 70 to upstream edge 72 of annular seat recess 74.

Seat 76, also annular in shape, is poured in place in recess 74 during manufacture of the body. Preferably it is made of synthetic rubber, but any one of a variety of commonly known resilient moldable materials with a memory may be substituted. Referring to the more detailed partial cross-section of FIG. 3, it can be seen that the seat has an inner wall 78, which is flush at its upstream edge 80 with edge 72 and tapers radially outward in a downstream direction therefrom. Positioned on the downstream side of the seat is annular seating surface 82 which lies in a plane substantially normal to axis "a". Seating surface 82 includes a plurality of concentric, integrally molded low pressure ribs 84 to improve the sealing capability of the seat. Outer edge 86 of the seat overlaps counter bore 88 so that the portion of the seal near seating surface 82 is permitted to expand outward in a radial direction as well as to compress axially when under pressure from the valve.

One advantage of this seat design is that the smooth transition thus provided between the body and the seat minimizes turbulence and pressure losses and also reduces the likelihood of solid matter and debris accumulating immediately upstream of the seat. Another advantage is that the seating surface being oriented in a downstream direction normal to the average flow is well protected from wear and abrasion by solid matter in the flow.

Downstream of seating surface 82 the passageway is expanded into generally cylindrical section 90 to reduce pressure losses when the valve is open. Enlargement of the passageway in this section is intended to compensate for the presence in the passageway of the clapper assembly when it is open.

The clapper assembly, generally indicated by numeral 92, is illustrated in a closed position in FIGS. 2 and 4 with solid lines and in the open position in FIG. 4 with phantom lines. It includes valve 94, bolt 96, adjustment nut 98, and arm 100. All four components are preferably made of stainless steel to resist corrosion and rust. Valve 94 is generally circular in shape and concave in the downstream direction. Upstream face 102 includes a flat annular seating surface 104 which is adapted to sealably engage seating surface 82 of the seal. The diameter of the valve is somewhat less than the maximum diameter of seating surface 82 permitting some degree of tolerance in the lateral alignment of the seating surfaces when the valve is closed. Outer edge 106 of the valve is preferably rounded to prevent chafing of seating surface 82 and to permit the edge to slide incrementally over the seating surface as the valve moves into position of alignment upon closing.

Valve 94 is loosely secured to arm 100 with bolt 96 and adjustment nut 98. Head 108 of the bolt is mechanically connected to the valve by weld 110 which extends completely around the base of the head and provides a fluid seal between the fastener and the valve. Threaded portion 112 of the bolt extends through hole 114 located in the center of the valve, through oversize hole 116 in the arm, and engages adjustment nut 98 on the downstream side of the arm. Bolt 96 is threaded into nut 98 until a predetermined clearance "c" is obtained between the arm and the valve as shown in FIG. 4. After the valve is properly adjusted, the nut is locked in position on the bolt by tack weld 117.

Arm 100, which is precision cast from stainless steel, is pivotally mounted within recess 118 of body 42 to minimize its projection into the passageway when the valve is open. It rotates about axis "b" which is substantially normal to longitudinal body axis "a". The arm includes recess 120 located on its downstream side, which is bounded by walls 122 and 124. Adjustment nut 98, which is partially disposed within the recess, is prevented from spinning about the longitudinal axis of bolt 96 by the walls. Surface 126 acts as a stop which limits the clockwise or opening rotation of arm 100 so as to prevent valve 94 or adjustment nut 98 from contacting the inner wall of the adjoining conduit (not shown) when the valve is in its full open position.

Shaft 128, which is preferably made of stainless steel passes through hole 130 in the upper end of arm 100 and is secured to the arm by removable set screw 132. The shaft is mounted for rotation in opposing bushings 134 and 136 which are fitted in colinear bores 138 and 140, respectively, in the body. Bore 138 extends from recess 118 completely through boss 142 to the outer surface of the body, and similarly, bore 140 extends completely through boss 144 to the outer surface. Each of the bushings is preferably mounted in its bore with an epoxy type sealant to prevent it from rotating and prevent leakage around the bore. Leakage between the shaft and the bushings is prevented by o-ring seals 146 and 148, each of which is mounted in a recess in the shaft.

Manual operation of the valve is permitted by lever 150 which is secured to the outer end of the shaft by removable pin 152. The lever, which is preferably made of stainless steel, has a handle 154 and a spring arm 156. If the clapper assembly and shaft were permitted to rotate freely in the body, valve 94 would have an undesirable tendency to slam shut upon sudden reversal of flow through the valve. Such slamming could damage the valve seat and would produce a potentially damaging pressure wave in the downstream portion of the valve. Ideally, the valve should approach a closed position as the flow rate decreases prior to reversal and close at the moment the flow ceases. In order to reduce the likelihood of slamming, the valve is biased toward a closed position by spring 158 which extends between spring arm 156 and bracket 160. Bracket 160 is threaded into flange 16 of the body and can be easily removed.

A significant advantage of this invention is that it permits the valve to be converted from right to left hand operation or vice versa in the field. This feature permits the use of a single valve in either position in the lift station and eliminates the necessity of stocking two different models of the same valve for repair purposes. Valve 12, which is arranged for left hand operation, can be quickly converted to right hand operation by removing spring 158 and unthreading bracket 160 from the body. Next, with valve 94 being held in an open position set screw 132 can be removed. Then the shaft with the handle attached can be slid to the left (see FIG. 2) until o-ring 146 emerges from bushing 134. After the o-ring has been removed from the shaft it can be slid in the opposite direction to the right and completely removed from the body. Then the remaining o-ring can be removed from the shaft and a lever can be removed by driving out pin 152 with a drift punch.

The first step in reassembling the valve is to reinstall the lever on the shaft with pin 152 and replace o-ring 148. After the shaft and o-ring have been lubricated, the shaft can be slid from the left into bushing 134, through arm 100 and into bushing 136. The end of the shaft should be slid beyond the right hand end of bushing 136 just far enough to permit o-ring 146 to be installed. Then the shaft can be centered and set screw 132 replaced. Finally, the set screw should be secured by staking its head in position on the arm.

Another advantage of this invention is it provides for rapid adjustment during assembly of the free angular movement of the valve relative to the arm. During assembly after the bolt 96 has been welded to the valve, it is inserted through oversized opening 114 in the arm to engage nut 98. By rotating the valve the bolt can be tightened until desired clearance "c" has been obtained. Alternately, the valve can be rotated until the desired amount of angular freeplay along any two axes normal to the fastener axis has been obtained. Finally, after the valve has been properly adjusted, nut 98 is locked in position on the bolt with tack weld 110. Limited angular freedom of the valve is desirable in order to permit reasonable tolerance in the dimensions and alignment of various components of the valve and yet insure that the seating surfaces of the valve and seat will be properly aligned upon closing. Also, the light relative movement between the valve and seat upon closing tends to scrub the seat and keep it free from accumulations which would interfere with sealing.

Certain other features of the valve are designed to facilitate its installation in a fluid conduit. When the valve is to be installed in a generally horizontal conduit it can be quickly aligned by loosely connecting the adjoining conduit flanges with a number of the lower connecting bolts and lowering the valve between the flanges onto the bolts. Then, the valve body should be rotated until boss 162 is projecting upward to place shaft 96 in an upper horizontal position as shown in FIG. 2. Finally, gaskets are to be placed in between the flanges, the remaining bolts are inserted, and all bolts are tightened.

Under normal operating conditions, flow passes through the valve in FIG. 4 from right to left and the clapper assembly is pivoted in a clockwise direction to a full open position. Surface 126 of the arm is in contact with the inner wall 60 near point 164. A further advantage of this present invention is that when the valve is fully open the passageway through the body is substantially unobstructed by the clapper assembly. Its presence in the passageway is compensated for by the increased cross-sectional area of section 120 so that effective cross-sectional areas upstream and downstream of the seal are substantially the same. In this manner pressure losses through the valve are minimized. Also the present invention incorporates various features to minimize the possibility that debris in the flow might hang on the valve and prevent proper seating. These features include the relatively smooth upstream face of the valve itself and the absence of large projections in the passageway which might tend to accumulate debris.

Thus, it can be seen that the present invention provides for an improved lever operated check valve which incorporates many novel features and offers significant advantages over the prior art. Although only one specific embodiment of this invention has been illustrated and described, it is to be understood that obvious modifications and changes can be made in it without departing from the true scope and spirit of the invention.

I claim:

1. A swing check valve convertible for right or left hand manual operation comprising:

a generally cylindrical body having an upstream face and an opposing downstream face arranged for disposition between a pair of opposed flanges in a fluid conduit and defining therebetween the axial length of said body, an inner surface defining a fluid passageway extending axially through said body and an outer surface;

an annular, resilient seat disposed within said fluid passageway, said seat including a first annular seating surface;

an arm pivotally mounted within said body or rotation within said passageway about an axis substantially normal to the axis of the body;

a generally circular valve loosely connected to said arm, said valve having an upstream face including a second annular seating surface adapted to sealably engage said first annular seating surface when said valve is in a closed position;

means forming a bore extending completely through and opening to opposite sides of said body;

a shaft adapted to be removably disposed for rotation in said bore and including a first portion adapted to be removably connected to said arm for rotation of said arm in response to rotation of said shaft, said shaft including a second portion adapted to extend from said bore on one of either of said opposite sides of said body for right or left hand operation of said valve;

biasing means for urging said valve into said closed position; and an externally mounted removable lever adapted to be mounted on said shaft and permitting manual operation of said check valve from either of said opposite sides of said body in either a right or left hand operating mode, respectively.

2. The check valve of claim 1 wherein said lever includes a handle and a spring arm and wherein said lever is connected to said shaft with a removable pin.

3. The check valve of claim 2 wherein said biasing means is a coiled spring extending between said spring arm and a bracket attached to said body.

4. The apparatus of claim 1 further comprising a threaded fastener for connecting said valve and said arm, said fastener being fixedly attached to said valve and permitting said valve two degrees of limited rotational freedom with respect to said arm while cooperating with said arm to restrict the significant rotation of said valve about the axis of said fastener.

5. The check valve of claim 1 wherein said valve is concave in the downstream direction and has in cross-section a rounded outer edge adjacent to said first seating surface to facilitate a sealing engagement of said first and second seating surfaces.

6. The check valve of claim 1 further including means for limiting the rotation of said arm against said biasing means to prevent said valve from contacting said inner surface of said fluid conduit as said valve opens.

7. A swing check valve convertible for left or right hand operation comprising:
a generally cylindrical body having an upstream face and an opposing downstream face arranged for disposition between a pair of opposed flanges in a fluid conduit and defining therebetween the axial length of said body, an inner surface defining a fluid passageway extending axially through said body and an outer surface;
an annular, resilient seat molded in place within said fluid passageway, said seat including a first annular seating surface and a generally cylindrical inner surface flush at its upstream edge with said inner surface;
an arm pivotally mounted within said body for rotation within said passageway about an axis substantially normal to the axis of the body;
a generally circular valve loosely connected to said arm, said valve having an upstream face and a second annular seating surface adapted to sealably engage said first annular seating surface when said valve is in a closed position;
biasing means connected to said arm for urging said valve into said closed position; and
a threaded fastener for connecting said valve and said arm, said fastener being fixedly attached to said valve and permitting said valve two degrees of limited rotational freedom with respect to said arm while cooperating with said arm to restrict the rotation of said valve about the axis of said fastener;
a shaft disposed for rotation in a base extending completely through said body and removably connected to said arm; and
an externally mounted lever removably connected to said shaft and permitting manual operation of said valve.

8. The swing check valve of claim 1 wherein said seat is molded in place within said fluid passageway and includes a first annular seating surface and a generally cylindrical inner surface flush at its upstream edge with said inner surface defining said fluid passageway.

9. The check valve of claim 1 wherein said inner surface of said seat tapers in cross section radially outward in a downstream direction to prevent the accumulation of debris immediately upstream of said seating surface.

10. The check valve of claim 1 wherein said first annular seating surface lies in a plane substantially normal to the axis of said body.

11. The check valve of claim 1 wherein said seat further includes a plurality of low pressure annular ribs integrally formed in said seating surface.

12. A swing check valve convertible for right or left hand operation comprising:
a generally cylindrical body having an upstream face and an opposing downstream face arranged for disposition between a pair of opposed flanges in a fluid conduit and defining therebetween the axial length of said body, an inner surface defining a fluid passageway extending axially through said body and an outer surface;
an annular, resilient seat disposed within said fluid passageway, said seat including a first annular seating surface;
an arm pivotally mounted within said body for rotation within said passageway about an axis substantially normal to the axis of the body, said arm including a recess bounded by a pair of opposing walls and wherein said valve is secured to said arm with fastening means including an adjustment nut at least partially disposed within said recess, said walls restricting the rotation of said nut and valve about an axis of said fastening means;
a generally circular valve loosely connected to said arm, said valve having an upstream face including a second annular seating surface adapted to sealably engage said first annular seating surface when said valve is in a closed position;
biasing means for urging said valve into said closed position; and an externally mounted removable lever connected to said arm and permitting manual operation of said check valve.

* * * * *